(12) United States Patent
Frank et al.

(10) Patent No.: US 11,548,417 B2
(45) Date of Patent: Jan. 10, 2023

(54) CHILD SAFETY SEAT WITH A MOTORIZED HARNESS BELT TENSIONER

(71) Applicant: Britax Römer Kindersicherheit GmbH, Leipheim (DE)

(72) Inventors: Richard Frank, Elchingen (DE); Janis Conrad, Gerstetten (DE)

(73) Assignee: Britax Romer Kindersicherheit GMBH, Leipheim (DE)

( * ) Notice: Subject to any disclaimer, the term of this patent is extended or adjusted under 35 U.S.C. 154(b) by 328 days.

(21) Appl. No.: 16/864,403

(22) Filed: May 1, 2020

(65) Prior Publication Data
US 2020/0346566 A1 Nov. 5, 2020

(30) Foreign Application Priority Data
May 2, 2019 (EP) .................................... 19172415

(51) Int. Cl.
*B60N 2/28* (2006.01)
*B60R 22/46* (2006.01)
*B60R 22/48* (2006.01)

(52) U.S. Cl.
CPC ......... *B60N 2/2884* (2013.01); *B60N 2/2812* (2013.01); *B60N 2/2821* (2013.01); *B60N 2/2869* (2013.01); *B60N 2/2875* (2013.01); *B60R 22/46* (2013.01); *B60R 22/48* (2013.01); *B60N 2002/2815* (2013.01); *B60R 2022/4808* (2013.01)

(58) Field of Classification Search
CPC .................. B60R 22/44; B60R 22/343; B60R 2022/4841; B60R 2022/4808; B60R 22/48; B60R 22/46; B60R 22/105; B60N 2002/2815; B60N 2/2863; B60N 2/2869; B60N 2/2812; B60N 2/2884
See application file for complete search history.

(56) References Cited

U.S. PATENT DOCUMENTS 7,140,571 B2 * 11/2006 Hishon .................. B60R 22/46
242/390.8
9,278,666 B2 * 3/2016 Leese ...................... B60R 22/48
9,751,433 B2 * 9/2017 Juchniewicz ........ B60N 2/2821

FOREIGN PATENT DOCUMENTS

| CN | 101015686 B | * | 5/2010 | |
| WO | WO-2014064012 A1 | * | 5/2014 | ........... B60N 2/2809 |
| WO | WO-2016174173 A1 | * | 11/2016 | ........... B60N 2/2809 |
| WO | WO-2019038393 A1 | * | 2/2019 | ........... B60N 2/2812 |

* cited by examiner

*Primary Examiner* — Milton Nelson, Jr.
(74) *Attorney, Agent, or Firm* — K&L Gates LLP; Philip Kunz; Samuel P. Richey (57) ABSTRACT

The invention relates to a child safety seat (100) comprising an integral harness belt (102) for restraining a child in the child safety seat (100), a belt tension monitor (106) adapted for monitoring a belt tension acting on the harness belt (102), a motorized harness belt tensioner (104) comprising a tensioning element (114) driven by an electromechanical actuator (122) and adapted for adjusting the belt tension acting on the harness belt (102), and a controller adapted for controlling the motorized harness belt tensioner (104) to adjust the belt tension to match a first predefined belt tension and for monitoring the resulting belt tension using the belt tension monitor (106).

15 Claims, 6 Drawing Sheets

CHILD SAFETY SEAT WITH A MOTORIZED HARNESS BELT TENSIONER

TECHNICAL FIELD

The present invention relates to child safety seats for use in passenger vehicles such as automobiles. Disclosed are a child safety seat, a method of operating a child safety seat and a computer program product for performing a method of operating a child safety seat.

BACKGROUND

Child safety seats can be placed on an installed seat of a passenger vehicle with or without a detachable connection to the vehicle frame, or they can be permanently installed in a vehicle. Passenger vehicles are usually also equipped with seat belts that can be used to secure a child safety seat and/or a child seated in the child safety seat to prevent injury during collisions or in other situations involving high acceleration/deceleration. Many vehicles also come with integrated anchoring structures to which a child safety seat can be attached, for example, according to the ISOFIX standard.

SUMMARY

The invention relates to a child safety seat. The child safety seat comprises an integral harness belt for restraining a child in the child safety seat and a motorized harness belt tensioner comprising a tensioning element driven by an electromechanical actuator and adapted for adjusting the belt tension acting on the harness belt. The adjusting may comprise shortening and/or lengthening a length of the harness belt available for buckling in the child. Furthermore, the child safety seat comprises a controller adapted for controlling the motorized harness belt tensioner to adjust the belt tension to match a first predefined belt tension.

Embodiments may have the beneficial effect of providing a motorized harness belt tensioner that may adjust the belt tension acting on the harness belt to a first predefined belt tension. The first predefined belt tension may be intended and/or targeted for a usual driving situation of a vehicle in which the child safety seat is installed. The first predefined belt tension may allow the child buckled into the child safety seat by the harness belt some room to move to avoid discomfort but at the same time prevent the child from escaping from the harness belt and/or protect the child during increased accelerations/decelerations in normal driving operations of the vehicle.

For example, the controller is adapted for controlling the motorized harness belt tensioner to increase the belt tension from the first predefined belt tension to a second predefined belt tension upon receiving a first trigger signal in the form of a pre-crash signal indicating a potential imminent accident involving a vehicle in which the child safety seat is installed.

Embodiments may further have the beneficial effect that the child may be prepared for a potential imminent accident by increasing the belt tension from the first predefined belt tension to the second predefined belt tension. The first predefined belt tension may be suitable for usual driving situations comprising acceleration and/or deceleration forces not exceeding a predefined threshold. The second predefined belt tension may be suitable for protecting the child against increased acceleration and/or deceleration forces exceeding a predefined threshold, as may occur just before a potential accident. Thus, an increase of the belt tension may increase the security of the child in the child safety seat. The pre-crash signal may be triggered upon a detection of increased acceleration and/or deceleration forces exceeding a predefined threshold. Such forces may be detected by a sensor comprised by the child safety seat and/or by a sensor comprised by the vehicle in which the child safety seat is installed. An increase of the belt tension may restrain the child more tightly within the child safety seat, effectively protecting the child from high relative accelerations and/or decelerations of the vehicle.

In accordance with an embodiment, the child safety seat is further comprising a belt tension monitor adapted for monitoring the belt tension acting on the harness belt, and the controller is further adapted for monitoring the belt tension resulting from the adjustment of the belt tension using the belt tension monitor.

In accordance with an embodiment, the harness belt may comprise an adjuster strap and/or a shoulder strap. To adjust the belt tension acting on the harness belt motorized harness belt tensioner may act on the adjuster strap and/or the shoulder strap. For example, the motorized harness belt tensioner may increase or decrease the tension acting on the adjuster strap and/or the shoulder strap.

Slack occurring in the harness belt due to insufficient belt tension may be dangerous for the child, who should be restrained by the harness belt. Slack may result in the child slipping out of a harness belt, for example, during a crash, causing severe injury. Slack may occur as the result of several factors, such as a bulk of winter clothing, movements of the child during tensioning of the harness belt, a buckle release and/or insufficient tensioning of the harness belt. A child safety seat may be able to guarantee maximum safety only if the child is restrained in the seat by a harness belt tightened under very specific conditions. Besides the location of the harness belt on the child's body, the tension of the harness belt is of significant importance. While it is obvious that a loose harness belt cannot suitably restrain the child, a harness belt that is too tight may be uncomfortable for the child, making it unsuitable for a longer journey.

Embodiments may have the beneficial effect of improving security and preventing misuse, i.e., misadjustments, of the harness belt. Correct installation of the harness belt may be achieved automatically and maintained continuously. The controller may alert the user if a problem with the harness belt occurs so that it can be corrected as soon as possible. Problems may, for example, comprise the child's escaping from the harness belt. Such an escape may, for example, be detected by a sudden, significant drop of belt tension or a buckle release, i.e., unfastening of the harness belt.

The controller may be adapted for indicating to the user whether a correct belt tension has been applied using, for example, audible and/or visible indicators. For example, an audible verification, i.e. sound, may be provided and/or a green light shown. A correct tension may, for example, be the first predefined belt tension. The controller may be further adapted for indicating an occurrence of a potentially dangerous amount of slack to the user, i.e., for indicating the belt tension falling under a predefined minimum threshold. For example, an audible warning, i.e., sound, may be provided and/or a red warning light shown. This may occur, for example, upon an unbuckling of the child.

The adjusting of the belt tension may result in taking an amount of slack out of the harness belt automatically after fastening the harness belt and/or manually pre-tensioning the harness belt.

Embodiments may have the beneficial effect that a user intending to restrain the child in the child safety seat does not have to manually adjust the belt tension acting on the harness belt to the first predetermined belt tension. The adjustment is instead controlled automatically by the controller, which may take into account the current belt tension acting on the harness belt determined by the belt tension monitor, which monitors the belt tension. If the determined belt tension deviates from the first predefined belt tension, particularly if the determined belt tension is less than the predefined belt tension, the controller may control the electromechanical actuator to drive the tensioning element so that the belt tension is adjusted to the first predefined belt tension. For example, the electromechanical actuator may comprise a drive shaft rotating the tensioning element. The tensioning element may be provided, for example, in the form of a spool. By rotating the tensioning element, the harness belt may be coiled up on the tensioning element or may be uncoiled from the tensioning element to shorten or lengthen the length of the harness belt available for buckling in the child. By shortening (decreasing) and lengthening (increasing) the length of the harness belt available for buckling in the child, the resulting belt tension may be increased or decreased, respectively. Using the belt tension monitor, the controller may be enabled to monitor the resulting belt tension to ensure that it matches the first predetermined belt tension.

For example, a child may be seated in the child safety seat by a user who fastened the harness belt. In accordance with an embodiment, the user may use an adjusting strap of the harness belt to increase the belt tension acting on the harness belt to secure the child. The manual tensioning of the harness belt by the user may result in a harness belt pre-tension that is adjusted to the first predefined belt tension by the controller controlling the motorized harness belt tensioner. Thus, the harness belt tension acting on the harness belt may be increased from the pre-tension to the first predefined belt tension. For this purpose, for example, the adjuster strap may be guided through the tensioning element. The motorized harness belt tensioner may be adapted for enabling manual pre-tensioning of the harness belt. For example, the adjuster strap may be guided through a clearance of the tensioning element so that the adjuster strap can be pulled through the tensioning element without exerting a force on the tensioning element. The pre-tension acting on the harness belt may be secured by an additional adjusting element, preventing the adjuster strap from being pulled back through the clearance of the tensioning element. After the pre-tensioning of the harness belt, the controller may control the motorized harness belt tensioner to adjust the pre-tension to match the first predefined belt tension. Automatically controlling the adjusting of the belt tension by the controller may have the beneficial effect that manual misadjustments may be effectively avoided.

The adjusting of the belt tensioner by the controller may be triggered by a trigger signal from a trigger switch manually operated by the user after pre-tensioning the harness belt. Alternatively, the adjusting may be triggered, preferably time-delayed, by a sensor signal from a fastening sensor, indicating that the harness belt has been fastened by the user. The time delay may have the beneficial effect that the user can, after fastening the harness belt, perform further adjustments, for example, pre-tensioning the harness belt without a risk of interfering with the adjusting of the belt tension by the controller. On the other hand, use of a sensor signal indicating a fastening of the harness belt may have the beneficial effect of mitigating the risk of the user forgetting to tension the harness belt. In accordance with an embodiment, the controller may be further adapted for providing a signal indicating that the harness belt is unfastened in the case of the vehicle being in motion and the fastening sensor detecting no fastening of the harness belt. For example, the controller may be operationally connected to an onboard computer of the vehicle or a mobile handheld telecommunication device of the user that uses the controller to determine whether the harness belt is fastened during driving of the vehicle. In the case of the harness belt being unfastened, a warning signal, for example, visual or acoustic, may be provided to warn the user that the harness belt of the child safety seat is unfastened. In accordance with an embodiment, the child safety seat may in addition be provided with a weight sensor adapted for detecting weight within the seating section of the child safety seat. If weight that exceeds a predefined threshold is detected, the weight sensor may send a sensor signal to the controller indicating that a child is seated in the child safety seat.

Embodiments may have the beneficial effect of avoiding, if no child is seated in the child safety seat, false or unnecessary alarms that the harness belt is unfastened.

In accordance with an embodiment, the motorized harness belt tensioner may be adapted for reversing the adjusting of the belt tension. For example, the adjusting of the belt tension to match the first predefined belt tension may be reversed in order to facilitate an unbuckling of the child by a user. The reversing of the adjusting of the belt tension may comprise decreasing the belt tension acting on the harness belt, for example, by lengthening a length of the harness belt available for buckling in the child. For example, a portion of the harness belt coiled by the motorized harness belt tensioner to increase the belt tension may be uncoiled to decrease the belt tension.

In accordance with an embodiment, the controller controls the motorized harness belt tensioner to reduce the belt tension adjusted to match the first predefined belt tension upon receiving a further trigger signal. The belt tension may be reduced to match a release belt tension for unbuckling and releasing the child. In accordance with an embodiment, the further trigger signal is received from a trigger element adapted for triggering the reduction of the belt tension to the release belt tension upon user interaction with the trigger element. Embodiments may have the beneficial effect of triggering a reversing of the adjusting of the belt tension depending on an explicit decision by the user. The user may, for example, trigger the trigger element such as a trigger switch before unbuckling the child.

In accordance with an embodiment, the electromechanical actuator is implemented in the form of an electric drive, for example, an electric servo motor. An electric drive, i.e., an electric motor, converts electromagnetic forces, such as an electric field, a magnetic field or both, to a linear or angular momentum. The respective linear or angular momentum may drive the tensioning element. For example, the electromechanical actuator may drive a drive shaft that in turn drives the tensioning element rotating around the same rotational axis as the drive shaft.

In accordance with an embodiment, the adjusting of the belt tension to the first predefined belt tension is performed by the controller without a preceding pre-tensioning of the harness belt by the user. In this case, a fully automated belt tensioning system may be implemented.

In accordance with an embodiment, the belt tension monitor may comprise, for example, a resistor element adapted for changing its electrical resistance/conductance proportional to a force, i.e., a pressure or tension applied to the resistor element. The belt tension monitor may comprise, for example, a piezoelectric element adapted for changing a charge distribution within the piezoelectric element proportional to a force, i.e., a pressure or tension applied to the piezoelectric element. The belt tension monitor may comprise, for example, an electrodynamic force sensor. The belt tension monitor may comprise, for example, a mechanical force sensor, like an elastic element, for example, a coil spring or an elastic membrane.

In accordance with an embodiment, a force provided by the electromechanical actuator is transmitted to the harness belt by the tensioning element to shorten and/or lengthen the length of the length of the harness belt available for buckling in the child. In accordance with an embodiment, the motorized harness belt tensioner comprises the belt tension monitor. In accordance with an embodiment, the electromechanical actuator may be adapted for monitoring of the belt tension, i.e., provide the belt tension monitor. For example, the electromechanical actuator may be adapted for monitoring the force transmitted to the harness belt by the tensioning element. In accordance with an embodiment, the motorized harness belt tensioner comprises the controller.

In accordance with an embodiment, the first predefined belt tension is defined by a predefined belt tension value. In accordance with an embodiment, the first predefined belt tension is defined by a belt tension interval. The belt tension interval may define a preferable belt tension value as well as a range of acceptable deviations from the preferable belt tension value.

Many child safety seat models comprise a dedicated child restraint system, such as an integral harness belt. Embodiments may have the beneficial effect of minimizing the risk of inertial movement of a child seated in the child safety seat within any slack in or clearance of the integral harness belt in the case of sudden acceleration or deceleration through a suitable tightening of the integral harness belt. Because of the automatic adjusting of the belt tension by the motorized harness belt tensioner, no additional tightening of the harness belt may be required.

It has to be noted that generally the vehicle may be any vehicle that may carry the child safety seat, including cars, trucks, boats, trains or airplanes. It is assumed that the vehicle can be assigned a forward direction x (roll axis), a lateral direction y (pitch axis) and a vertical direction z (yaw axis). The negative forward direction is referred to herein as the backward or reverse direction.

Likewise, the child safety seat is not restricted to any particular design. For instance, the child safety seat may be adapted for receiving a child in a sitting position, in a lying position (as may be the case with infant carriers or baby carriers) or in a transitional (tilted) position between sitting and lying. The child safety seat is also not restricted to fit the vehicle in any particular orientation, as may be the case with seats adapted for installation in the vehicle such that an occupant of the seat faces the forward or backward direction of the vehicle. Further, child safety seats that can be turned around a pivot point in between an entry position and a functioning position may be used. In the entry position, the seat may be oriented laterally so that an adult may easily position the child in the seat and then turn the seat toward the functioning position in which the child faces in the forward or backward direction of the vehicle.

The child safety seat may be placed on and/or attached to a seat of the vehicle comprising anchorage points to which the child safety seat can be connected. For example, the child safety seat may comprise locking mechanisms that make use of or are based on the conventional ISOFIX locking mechanism (or ISOFIX attachments). ISOFIX attachments are adapted to engage with corresponding anchorage points that are arranged in a line behind the area of the inflection point in which the seat surface of the vehicle seat borders on the seat backrest of the vehicle seat on which the child safety seat is to be installed.

In accordance with an embodiment, at least one adjuster strap of the harness belt is guided through the tensioning element. The adjusting the belt tension comprises adjusting a tension in the at least one adjuster strap of the harness belt. Embodiments may have the beneficial effect that the adjuster strap may be looped through the tensioning element to enable manual pre-tensioning of the harness belt.

Thus, the controller may provide for an additional tensioning of the harness belt in addition to the manual pre-tensioning.

In accordance with an embodiment, at least an end section of the harness belt is attached to the tensioning element. Embodiments may have the beneficial effect that the motorized harness belt tensioner may be provided in the form of a retractor adapted for coiling and uncoiling the end section of the harness belt. By coiling the end section of the harness belt, the length of the harness belt available for buckling in the child may be shortened and thus the belt tension applied to the harness belt increased. By uncoiling the end section of the harness belt, the length of the harness belt available for buckling in the child may be lengthened and thus the belt tension applied to the harness belt decreased. For example, the belt tension may be reduced to facilitate an unbuckling of the child by the user. In accordance with an embodiment, the end section may be a section of a shoulder strap and/or an adjuster strap. In this case, the adjuster strap may only be adapted for an automatic adjusting of the belt tension by the motorized harness belt tensioner, not for a manual pre-tensioning by the user. For example, the adjuster strap may not be guided through the tensioning element, but rather attached to it.

In accordance with an embodiment, the end section of the harness belt is directly attached to the tensioning element. In accordance with an embodiment, the end section of the harness belt is rigidly fixed to the tensioning element. In accordance with an embodiment, the end section of the harness belt is attached to the tensioning element via one or more force-transmitting elements, for example, a pulling cable.

In accordance with an embodiment, the belt tension adjusted to match the first predefined belt tension results from a manual pre-tensioning of the harness belt. In accordance with an embodiment, the harness belt comprises at least one adjuster strap for manually pre-tensioning the harness belt.

In accordance with an embodiment, the controller controls the motorized harness belt tensioner to adjust the belt tension to match the first predefined belt tension upon receiving a second trigger signal.

In accordance with an embodiment, the adjusting comprises an increasing of the belt tension by shortening the length of the harness belt available for buckling in the child to match the first predefined belt tension. Embodiments may have the beneficial effect of effectively restraining the child in the child safety seat to secure the child.

In accordance with an embodiment, the belt tension increased to match the first predefined belt tension results from a manual pre-tensioning of the harness belt. Embodiments may have the beneficial effect of ensuring a correct adjustment of the belt tension to match the first predefined belt tension and at the same time allowing for a pre-tensioning of the harness belt, for example, for securing the child during adjustments of the child safety seat performed by the user. For example, the child safety seat may comprise a supporting base and a seat element, which provides seating for the child in the seat. The seat element is mounted rotatably relative to the supporting base. The additional adjustment may comprise a rotation of the seat horizontally between an entry position and a driving position.

In accordance with an embodiment, the controller controls the motorized harness belt tensioner to increase the belt tension to match the first predefined belt tension upon receiving a second trigger signal.

In accordance with an embodiment, the second trigger signal is received from a trigger element adapted for triggering the increase of the belt tension upon user interaction with the trigger element. Embodiments may have the beneficial effect of triggering the adjusting of the belt tension depending on an explicit decision by the user. The user may, for example, trigger a trigger element such as a trigger switch upon seating the child in the child safety seat and fastening the harness belt.

In accordance with an embodiment, the trigger element is a user interface. For example, the trigger element may be provided by a switch. Operation of the switch by a user may generate the second trigger signal, triggering an increase of the belt tension.

In accordance with an embodiment, the trigger element is adapted for adjusting the belt tension upon user interaction with the trigger element. The adjusting may comprise an increasing or decreasing of the belt tension depending on the type of user interaction with the trigger element. For example, the trigger element may be provided by a switch enabling the user to select between a triggering of an increase of the belt tension and a triggering of a decrease of the belt tension. For example, the belt tension may be increased to secure the child after it has been seated in the child safety seat and the harness belt has been fastened. The belt tension may be decreased, for example, to facilitate an unfastening of the harness belt for taking the child out of the child safety seat.

In accordance with an embodiment, the second trigger signal is received from a harness belt fastening sensor upon detection of a fastening of the harness belt. Preferably, the sending of the second trigger signal is time-delayed by a predefined interval of time. Embodiments may have the beneficial effect that the adjusting of the belt tension is performed automatically upon fastening the harness belt. Thus, any risk of forgetting to adjust the belt tension of the harness belt may be effectively avoided. Sending the second trigger signal time-delayed by a predefined interval of time may have the beneficial effect of giving the user sufficient time after fastening the harness belt to prepare the child, the child safety seat and/or the harness belt for adjusting the belt tension.

In accordance with an embodiment, the second trigger signal is received upon detecting manual pre-tensioning of the harness belt exceeding a predefined pre-tensioning threshold. Embodiments may have the beneficial effect that adjustment of the harness belt may be performed automatically upon manual pre-tensioning of the harness belt.

In accordance with an embodiment, the controller is adapted for controlling the motorized harness belt tensioner to decrease the belt tension from the second predefined belt tension to the first predefined belt tension upon meeting a predefined criterion. In accordance with an embodiment, the predefined criterion comprises exceeding a predefined interval of time after receiving the pre-crash signal without receiving a crash signal.

Embodiments may have the beneficial effect that the increase of the belt tension may be reversed. For example, the reversion may be performed if no further accelerations and/or decelerations exceeding the predefined threshold are determined for a predefined time interval.

Thus, applying the second predefined belt tension may effectively be restricted to scenarios of increased accelerations and/or decelerations, such as those that occur in scenarios of a potential imminent accident.

In accordance with an embodiment, the controller is adapted for controlling the motorized harness belt tensioner to increase the belt tension from the second predefined belt tension to a third predefined belt tension upon receiving a third trigger signal in the form of a crash signal indicating an accident involving a vehicle in which the child safety seat is installed.

Embodiments may have the beneficial effect of further increasing the belt tension in the case of an actual accident. The third predefined belt tension may be intended for an accident, such as a car crash, wherein very large accelerations and/or decelerations may act on the child in the child safety seat against which the child needs to be protected effectively. Such effective protection may be provided by the third predefined belt tension. Embodiments may have the beneficial effect that applying the third predefined belt tension may be restricted to actual accidents only.

In accordance with an embodiment, the tensioning element may comprise a spool, coil, cam, pin or lever mechanism. For example, the tensioning element may comprise a spool with at least two pins around which the harness belt may be coiled to increase the belt tension. The pins may be arranged eccentrically with respect to an axis of rotation of the spool.

In accordance with an embodiment, the tensioning element is operatively connected to a ratchet. The ratchet may be adapted for preventing an uncoiling of the harness belt from the tensioning element, while a coiling of the harness belt onto the tensioning element may be unrestricted by the ratchet. To also enable an uncoiling of the harness belt for decreasing the belt tension, the ratchet may be transferred from a blocking position with, for example, a finger of a pawl of the ratchet engaged with a recess between two teeth of the toothing of the ratchet, like a gear wheel, to a release position with the finger disengaged from the toothing. The transfer may be executed by a release mechanism. The release mechanism may comprise a drive coupled to the ratchet.

In accordance with an embodiment, the motorized harness belt tensioner is located within a base of the child safety seat.

In accordance with an embodiment, an extend of adjustment the belt tension by the tensioning mechanism, i.e., the motorized harness belt tensioner, is limited to a maximum extent of adjustment, for example, a maximum length by which the harness belt available for buckling in the child may be shortened and/or lengthened.

In accordance with an embodiment, the controller may be adapted for alarming the user if the tensioning mechanism reaches the maximum extend of adjustment, for example, if the tension mechanism is not able to match the first predefined belt tension. For alarming the user, for example, audible and/or visible indicators may be used. For example, an audible alarm, i.e. sound, may be provided and/or a red light shown. Thus, an occurrence of an insufficient belt tension, for example a potentially dangerous amount of slack, which the tensioning mechanisms is unable adjust may be indicated to the user. This may occur, for example, upon an unbuckling of the child.

In accordance with an embodiment, the tensioning mechanism implemented by the motorized harness belt tensioner comprises a force limiter for limiting the belt tension to the predefined maximum value. Embodiments may have the beneficial effect of limiting the maximum value of belt tension, i.e., the harness belt may be prevented from being tightened too strongly, thus ensuring that the child will not suffer pain or even discomfort as a result. A force limiter may be implemented using, for example, a slip clutch or an elastic mechanism such as a spring. The force limiter may, for example, prevent the belt tension from exceeding the third predefined belt tension.

In accordance with an embodiment, the force limiter comprises a slip clutch or an elastic mechanism. Embodiments may have the beneficial effect that a force limiter comprising a slip clutch may efficiently and effectively limit the amount of harness belt tension that can be applied by the motorized harness belt tensioner. For example, the slip clutch may be implemented between the electromechanical actuator and the tensioning element.

For example, the slip clutch may be implemented in the form of a torque-limiting clutch, also referred to as a torque limiter, that disengages, resulting in a slip once a predefined maximum torque is reached.

An elastic mechanism may comprise a mechanical spring, for example. The spring may be used for restricting a pulling force. According to Hooke's law $Fs=ks*xs$, the length xs by which a spring is extended due to pulling force Fs is proportional to the respective pulling force Fs. The constant of proportionality ks is characteristic for the spring used. Thus, for example, using a spring with a proportionality ks for which, if $Fs=Fmax$ with Fmax being a predefined maximum value for the belt tension, the resulting xs equals a maximum distance xmax, i.e., $xs=xmax$, by which the electromechanical actuator can move (rotate) the tensioning element, ensures that the maximum force by which the belt is tensioned is restricted to Fmax.

In accordance with an embodiment, the child safety seat is an infant carrier.

In accordance with an embodiment, the controller is operationally connectable with a user interface and adapted for signaling to the user interface information about the belt tension acting on the harness belt.

Embodiments may have the beneficial effect of informing the user about the current belt tension acting on the harness belt. For example, a green light may be switched on upon matching the first predefined belt tension to indicate to the user that the child has been suitably restrained within the child safety seat.

In accordance with an embodiment, the user interface is comprised by the child safety seat.

In accordance with an embodiment, the user interface is provided by an onboard vehicle computer of a vehicle in which the child safety seat is installed. In accordance with an embodiment, the user interface is provided by a handheld mobile telecommunication device, such as a smartphone.

In accordance with an embodiment, the child safety seat further comprises a belt tension monitor coupled to a user interface. The belt tension monitor is adapted to signal information about the tension of the harness belt via the user interface. Embodiments may have the beneficial effect of providing a user, via the user interface, with information about the belt tension. Thus, a user positioning a child in the child safety seat and buckling the harness belt can be sure that the belt tension is suitable but does not exceed the predefined maximum value. The user interface may comprise, for example, an electric display or a mechanical force meter, such as a spring-based force meter.

In accordance with an embodiment, the controller is adapted for continuously monitoring the belt tension using the belt tension monitor, the adjusting comprising a readjusting of the belt tension to re-match the first predefined belt tension upon detecting a deviation of the belt tension from the first predefined belt tension exceeding a predefined belt tension threshold.

Embodiments may have the beneficial effect of implementing real-time monitoring of belt tension. The controller may continuously work to ensure the harness is being tensioned sufficiently and to alert the user of any potential problem detected. Sufficient tensioning may be provided by a belt tension matching the first predefined belt tension.

Embodiments may have the beneficial effect that changes in belt tension may be monitored continuously and belt tension may be readjusted depending on the respective changes to continuously match the first predefined belt tension. Thus, suitable belt tension may be continuously maintained throughout a driving mode of the vehicle, i.e. while the vehicle is driving.

In another aspect, the invention relates to a method of operating a child safety seat. The child safety seat comprises an integral harness belt for restraining a child in the child safety seat, and a motorized harness belt tensioner comprising a tensioning element driven by an electromechanical actuator and adapted for adjusting the belt tension acting on the harness belt. The adjusting may comprise shortening and/or lengthening a length of the harness belt available for buckling in the child.

Furthermore, the child safety seat comprises a controller adapted for controlling the motorized harness belt tensioner to adjust the belt tension to match a first predefined belt tension and for monitoring the resulting belt tension using the belt tension monitor.

The method of operating a child safety seat comprises determining the belt tension acting on the harness belt and, if the determined belt tension deviates from the first predefined belt tension, adjusting the belt tension acting on the harness belt to match the first predefined belt tension.

The method may further be configured for operating any embodiments of the child safety seat disclosed herein.

In accordance with an embodiment, if the deviation exceeds a predefined belt tension threshold, the belt tension is adjusted to match the first predefined belt tension. The method may be initiated, for example, upon receiving a trigger signal indicating that a child is seated within the child safety seat.

In another aspect, the invention relates to a computer program product. The computer program product comprises computer-executable instructions to perform the method according to any embodiment disclosed herein.

The above-described examples and embodiments as well as any features shown in the figures and described below may be combined freely as long as the individual examples and embodiments are not mutually exclusive.

BRIEF DESCRIPTION OF DRAWINGS

Embodiments of the present invention will be discussed with reference to the accompanying drawings wherein.

In the following, similar elements are denoted by the same reference numerals.

DESCRIPTION OF EMBODIMENTS

Figure 1A:
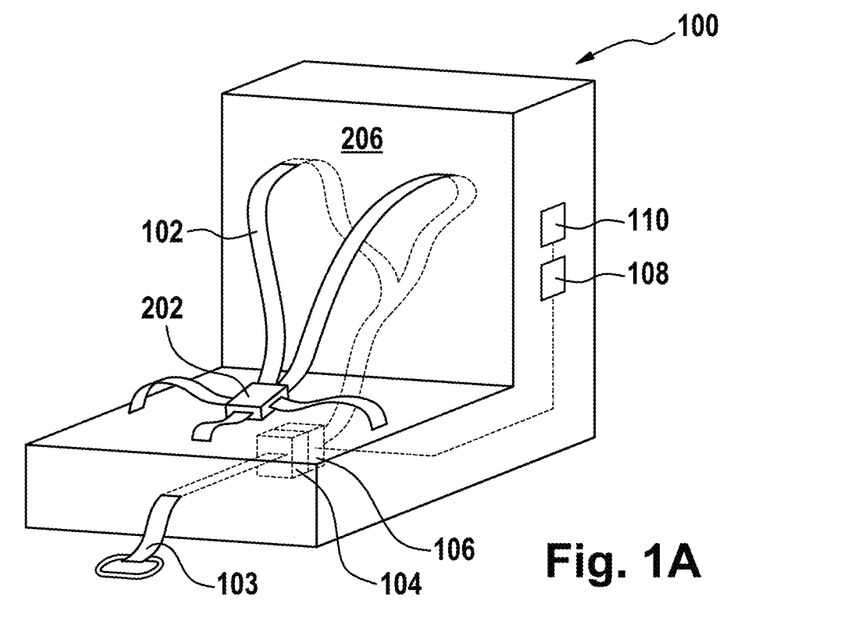
FIG. 1A shows a first exemplary child safety seat.

FIG. 1A shows a schematic drawing of a first exemplary child safety seat 100. The child safety seat 100 comprises an integral harness belt 102 and a motorized harness belt tensioner 104. The motorized harness belt tensioner 104 may comprise an electromechanical actuator and a tensioning element. The tensioning element is driven by the electromechanical actuator to adjust the tension of the harness belt 102. For example, the motorized harness belt tensioner 104 is located within the base of the child safety seat. An adjuster strap 103 of the harness belt 104 is guided through the tensioning element. The adjuster strap may be used by the user of the child safety seat 100 for pre-tensioning the harness belt 102 upon seating a child in the child safety seat 100 and fastening the harness belt 102. The belt tension acting on the harness belt may be adjusted via the adjuster strap 103, i.e., by adjusting the tension in the adjuster strap 103. The motorized harness belt tensioner 104 may further comprise a controller adapted for controlling the motorized harness belt tensioner 104 and a communication interface adapted for receiving trigger signals. The controller of the motorized harness belt tensioner 104 may be adapted for adjusting the belt tension acting on the harness belt to match a first predefined belt tension in response to receiving a trigger signal via the communication interface. The child safety seat 100 may further comprise a belt tension monitor 106 adapted for monitoring the belt tension acting on the harness belt 102. The belt tension e.g. determined by the belt tension monitor 106 may be used by the controller to determine whether an adjustment is necessary and/or ensure that the belt tension resulting from the adjustment matches the predefined belt tension. The belt tension monitor 106 may be provided as an independent element, or it may be provided by the motorized harness belt tensioner 104, for example, by the electromechanical actuator. The electromechanical actuator may be adapted to determine the belt tension acting on the harness belt due to a force exerted on the harness belt by the electromechanical actuator via the tensioning element.

The trigger signal may indicate that a child has been buckled in using the integral harness belt 102, and the predefined belt tension may be the first predefined belt tension defined for driving mode of the child safety seat 100. The trigger signal may be sent, for example, from a trigger switch upon activation by a user of the child safety seat 100. The trigger signal may be sent, for example, from a fastening sensor (not shown) upon detecting a fastening of the harness belt of the child safety seat 100. Preferably, the trigger signal sent by the fastening sensor may be time-delayed. The trigger signal may be sent, for example, from the belt tension monitor 106 upon detecting manual pre-tensioning of the harness belt 102 by the user using the adjuster strap 103.

In the driving mode, the controller of the motorized harness belt tensioner 104 may further be adapted for continuously monitoring the belt tension of the harness belt 102 using the belt tension monitor 106. Based on the belt tensions monitored, the controller, upon detecting a deviation of the belt tension from the first predefined belt tension, may readjust the belt tension to re-match the first predefined belt tension. For example, the readjustment may be performed if the deviation exceeds a predefined belt tension threshold.

The trigger signal may be a pre-crash signal, also referred to as a first trigger signal, which is received via the communication interface, indicating a potential imminent accident involving a vehicle in which the child safety seat 100 is installed. The pre-crash signal may be sent, for example, because of the detection of an increased acceleration and/or deceleration characteristic of a pre-crash scenario. The increased acceleration and/or deceleration may be detected by sensors comprised by the child safety seat 100 and/or by the vehicle. Upon receipt of the pre-crash signal, the controller may switch from a driving mode to a pre-crash mode, increasing the first predefined belt tension to a second predefined belt tension to provide more security for the child due to a tighter fixation of the child to the child safety seat 100.

The trigger signal may be a crash signal received via the communication interface, indicating an actual accident involving a vehicle in which the child safety seat 100 is installed, such as a crash against an obstacle. The crash signal may be sent, for example, because of the detection of a further increased acceleration and/or deceleration characteristic of a crash scenario. The further increased acceleration and/or deceleration may be detected by sensors comprised by the child safety seat 100 and/or by the vehicle. Upon receipt of the crash signal, the controller may switch from pre-crash mode to a crash mode, increasing the second predefined belt tension to a third predefined belt tension to provide more security for the child against high accelerations and/or decelerations characteristic of a crash by establishing an even tighter fixation of the child to the child safety seat 100.

The child safety seat 100 may be, for example, a chair-like seat allowing a child seated in the child safety seat to rest in a sitting position, or an infant carrier allowing an infant to rest in a lying position. The child safety seat 100 may further comprise, without limitation, one or more of the following: a buckle 202 or equivalent counterpart for fastening a tongue or equivalent means of the integral harness belt 102; a force-limiting means for limiting to a predetermined maximum force the harness belt tension upon fastening with the buckle 202; armrests 208; a headrest; a backrest 206; one or more connectors 210 for establishing a positive connection with the frame of a vehicle; a seat shell 209; and a user interface 110 coupled to a belt tension monitor 106 adapted to signal information about the tension of the harness belt via the user interface 110.

The integral harness belt 102 may further comprise, without limitation, a tongue or equivalent means adapted for being engaged with a buckle 202 or equivalent counterpart fixed to or located at the body of the child safety seat 100.

The communication interface may be a passive interface (for example, a plug socket or an antenna circuit) or an active interface comprising an electronic communication control unit. Without limitation, the communication interface may be adapted for receiving a trigger signal via a wired communication connection, a wireless or over-the-air communication connection, or an optical communication connection. As an example, the communication interface is configured to receive the trigger signal via a Bluetooth/aptX Low Latency connection. In accordance with an embodiment, the communication interface may further be adapted for sending to a user interface information about the belt tension acting on the harness belt 102. The user interface 110 may be comprised, for example, by the child safety seat 100. In accordance with an embodiment, the user interface 110 may comprise the trigger switch 108. The user interface may be, for example, a user interface provided by an onboard computer of the vehicle or a handheld mobile telecommunication device of the user of the child safety seat 100, such as a smartphone.

Figure 1B:
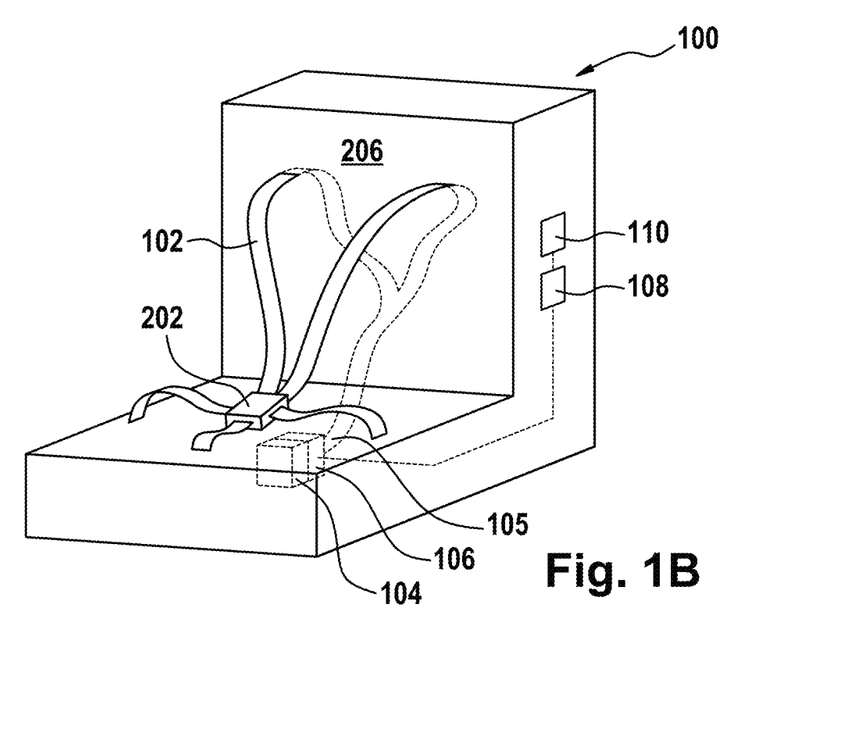
FIG. 1B shows a second exemplary child safety seat.

FIG. 1B shows a schematic drawing of an alternative second exemplary child safety seat 100. The child safety seat 100 of FIG. 1B is identical to the child safety seat 100 of FIG. 1A except for the mechanical connection between harness belt 102 and motorized harness belt tensioner 104. Instead of an adjuster strap 103 being guided through the tension element of the motorized harness belt tensioner 104, an end section 105 of the harness belt 102 is attached to the tension element. For example, the end section 105 of the harness belt 102 is rigidly fixed to the tension element. The tension of the harness belt 102 may be implemented by the motorized harness belt tensioner 104 completely automatically, without manual pre-tensioning of the harness belt 102 using an adjuster strap 103. For example, the end section 105 of the harness belt 102 may be coiled by the tensioning element driven by the electromechanical actuator. Thus, the harness belt 102 may be pulled into the child safety seat 100, shortening the length of the harness belt 102 available for buckling the child into the child safety seat 100.

Figure 2:
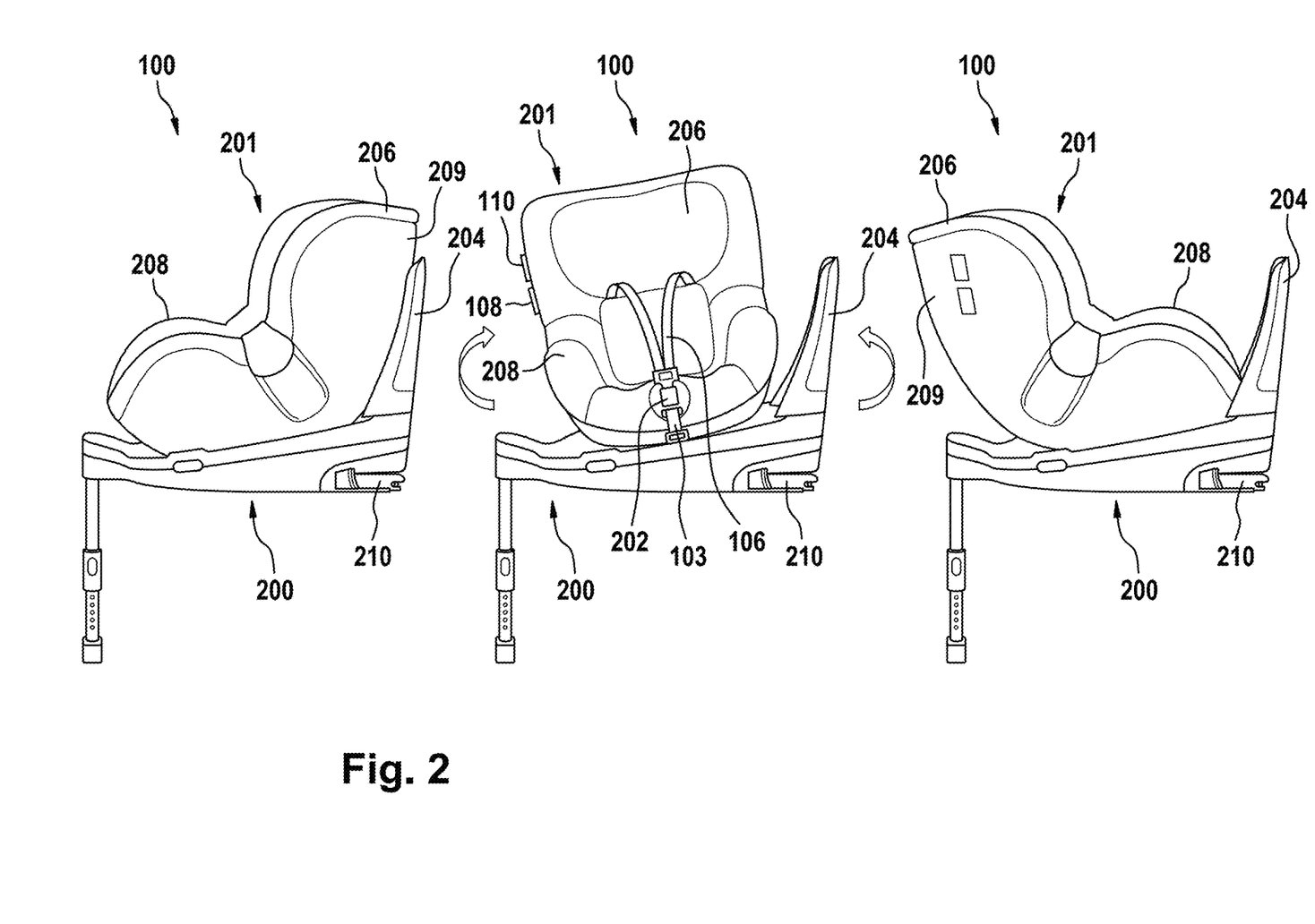
FIG. 2 shows orientations of a third exemplary child safety seat.

FIG. 2 shows a schematic drawing of first, second and third exemplary orientations of a child safety seat 100. The child safety seat 100 comprises a seat element 201 that is pivot-mounted on a supporting base 200. The child safety seat 100 may further comprise, without limitation, one or more of the following: a buckle 202 or equivalent counterpart for fastening a tongue or equivalent means of the integral harness belt 102; a force-limiting means for limiting to a predetermined maximum force the harness belt tension upon fastening with the buckle 202; armrests 208; a headrest; a backrest 206; one or more connectors 210 for establishing a positive connection with the frame of a vehicle; a seat shell 209; a rebound bar 204, adapted for being fixed rigidly to the child safety seat 100 and for forming an abutment with respect to a vehicle seat on which the child safety seat 100 is to be installed; a user interface 110 coupled to a belt tension monitor adapted to signal information about the tension of the harness belt via the user interface 110; and one or more joints, axes, pivots or other means allowing for a vertical and/or horizontal rotation of one or more elements of the seat element 201 relative to a supporting base 200 or a vehicle seat on which the child safety seat 100 is to be installed.

On the left-hand side, the seat element 201 and supporting base 200 are shown in the second relative orientation, which permits the child located in the seat 100 to face the forward direction of a vehicle seat (not shown) receiving the child safety seat 100 with the seat element 201 mounted on the supporting base 200. In the center of the drawing, the seat element 201 and supporting base 200 are shown in the first relative orientation, which permits the child located in the seat element 201 to face the left side of the vehicle seat relative to said forward direction of the vehicle seat. This orientation, i.e., the entry position, provides an easy entry for laterally positioning the child in the child safety seat 100. On the right-hand side, the seat element 201 and supporting base 200 are shown in the third relative orientation, i.e., the driving position, which permits the child to be located in the seat element 201 facing the backrest of the vehicle seat, i.e., opposite said forward direction of the vehicle seat.

The three orientations may be transformed from one to another by horizontal rotation of the seat element 201 relative to the supporting base 200, as indicated by bent arrows between the first and second orientations and, respectively, between the first and third orientations. The child safety seat 100 may comprise a mechanism, for example, a gearing mechanism, a Bowden cable or the like, for converting a rotational motion force originating from the horizontal rotation of the seat element 201 between the first and second orientations or, respectively, between the first and third orientations, into a tension of the harness belt 102.

Figure 3:
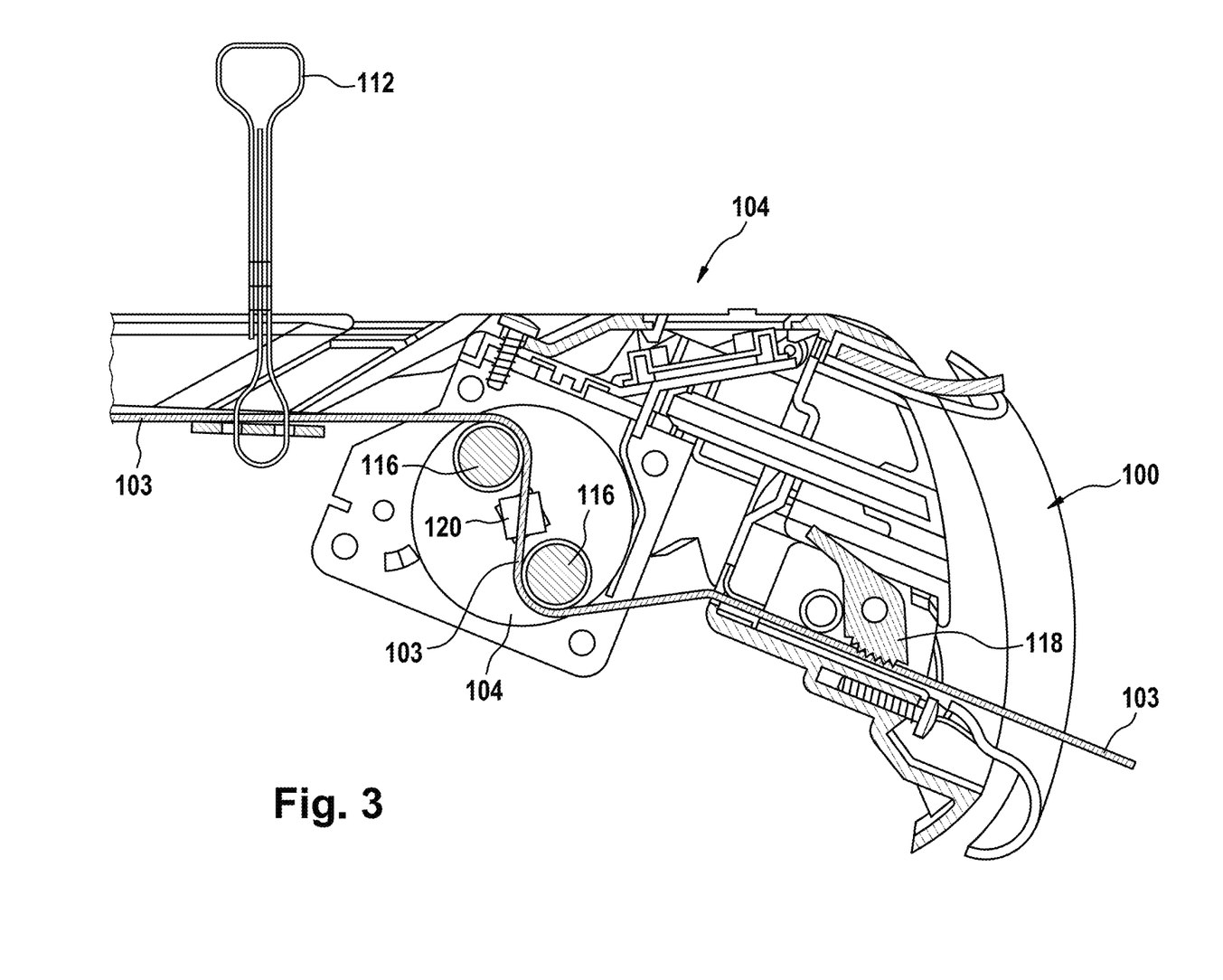
FIG. 3 shows an exemplary motorized harness belt tensioner.

FIG. 3 shows the exemplary motorized harness belt tensioner 104 of the child safety seat of FIG. 1 in more detail. Depicted is a cross-sectional view of the motorized harness belt tensioner 104. The adjuster strap 103 runs through a child safety seat 100. A left end of the adjuster strap 103 runs into the harness belt 102 or is part of the harness belt 102 (not shown). The harness belt 102 (not shown) may be fastened using fixation means 112 that might comprise a buckle (not shown). In accordance with an embodiment, the fixation means 112 may comprise a fastening sensor adapted for detecting a fastening of the harness belt 102 (not shown) with fixation means 112.

The motorized harness belt tensioner 104 may comprise a tensioning element 114 adapted for adjusting the belt tension of the harness belt 102 (not shown). The belt tension acting on the harness belt 102 (not shown) between one end rigidly fixed by the fixing means 112 and the other end tensioned as a result of tensioning element 114 acting on the adjuster strap 103 may be adjusted by the motorized harness belt tensioner 104 to match a first predefined belt tension in a driving mode of the child safety seat 100. In the case of a switch to the pre-crash or even the crash mode of the child safety seat 100, the belt tension acting on the harness belt 102 (not shown) may be further increased by the motorized harness belt tensioner 104 to match a second predefined belt tension or a third predefined belt tension, respectively. The right end of the adjuster strap 103 may leave the child safety seat 100 and comprise, for example, a loop onto which the user may hold when pre-tensioning the harness belt 102 (not shown) by pulling the adjuster strap 103 further out of the child safety seat 100.

The tensioning element 114 comprises a spool with two guiding pins 116. In an initial orientation of the tensioning element 114, the two guiding pins 116 may be arranged vertically above each other with a clearance between the two guiding pins 116 through which the adjuster strap 103 may be horizontally pulled by a user of the child safety seat 100. In this initial orientation, the guiding pins 116 and thus the tensioning element 114 may not have been forced to move because of a manual pre-tensioning of the adjuster strap 103 by the user. According to an alternative embodiment, the guiding pins 116 may not be positioned vertically above each other in the initial orientation, resulting in a movement of the guiding pins 116 and thus the tensioning element 114 due to manual pre-tensioning. A clamping device 118 may be spring-loaded and restrict the direction of movement of the adjuster strip to one direction, i.e., out of the child safety seat 100 for manual pre-tensioning. Thus, the adjuster strap 103 may be prevented from losing tension by the clamping device 118, disabling a movement of the adjuster strap 103 toward the inside of the child safety seat 100. Upon pulling the adjuster strap 103 toward the outside of the child safety seat 100, the clamping device 118 may be released, while it may be locked upon pulling the adjuster strap 103 toward the inside of the child safety seat 100. To decrease the belt tension acting on the harness belt 102 (not shown), the motorized harness belt tensioner 104 may comprise a drive for releasing the spring-loaded clamping device 118.

To increase the belt tension acting on the harness belt 102 (not shown) via the adjuster strap 103, the tensioning element 114 may be rotated by an electromechanical actuator rotating a drive shaft 120 mechanically connected with the tensioning element 114. By rotating the tensioning element 114, the adjuster strap 103 is coiled on the guiding pins 116, shortening the length of the harness belt 102 (not shown) available for buckling in the child.

Figure 4:
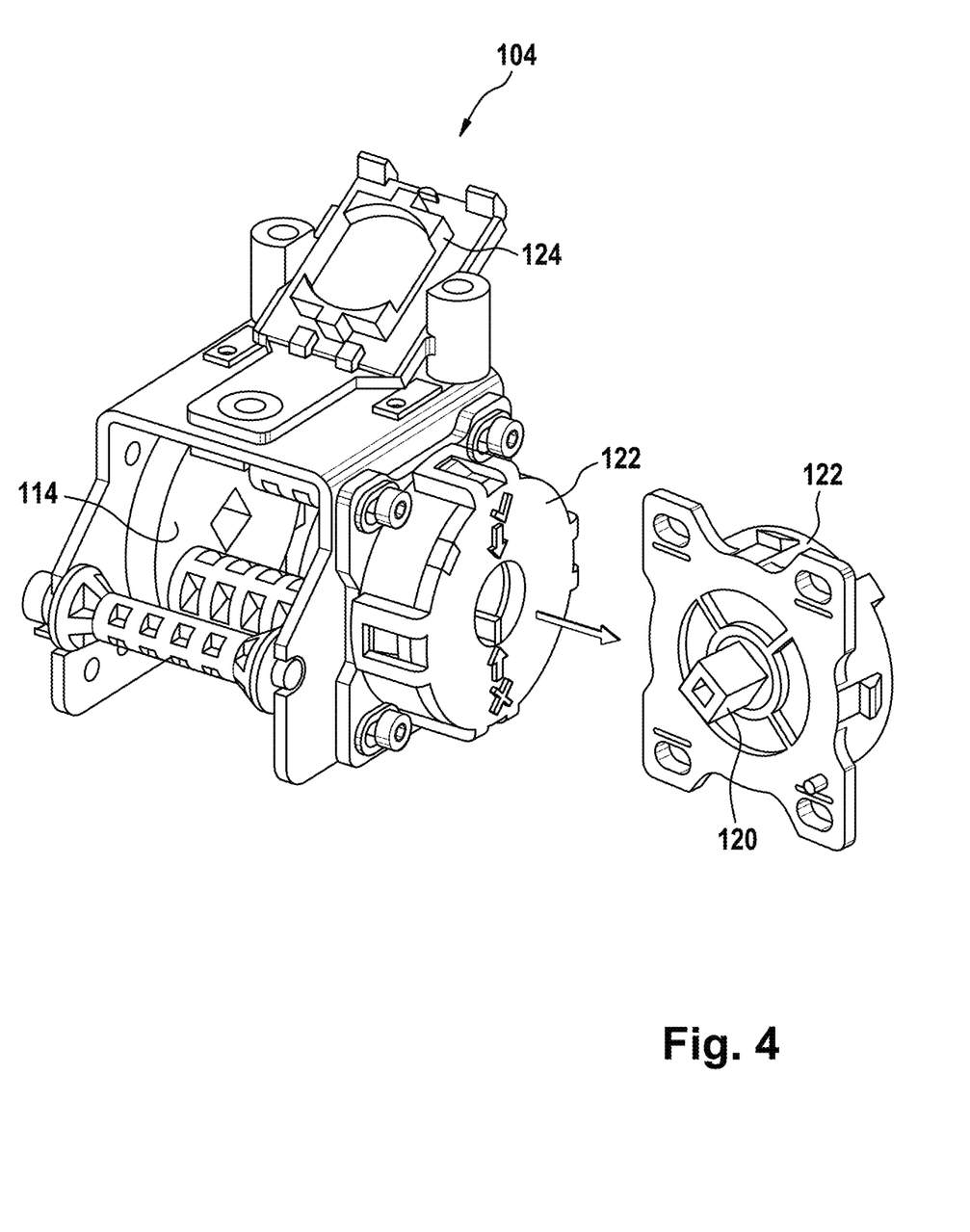
FIG. 4 shows the exemplary motorized harness belt tensioner of FIG. 3.

FIG. 4 shows the exemplary motorized harness belt tensioner 104 of FIG. 3. The motorized harness belt tensioner 104 comprises an electromechanical actuator 122 adapted for rotating a drive shaft 120 mechanically connected with the tensioning element 114. Thus, a rotation of the drive shaft 120 may be transmitted to the tensioning element 114, which is rotated around the same axis of rotation. The motorized harness belt tensioner 104 may provide an LED and/or a battery holder 124 for a user interface 110 (not shown).

Figure 5:
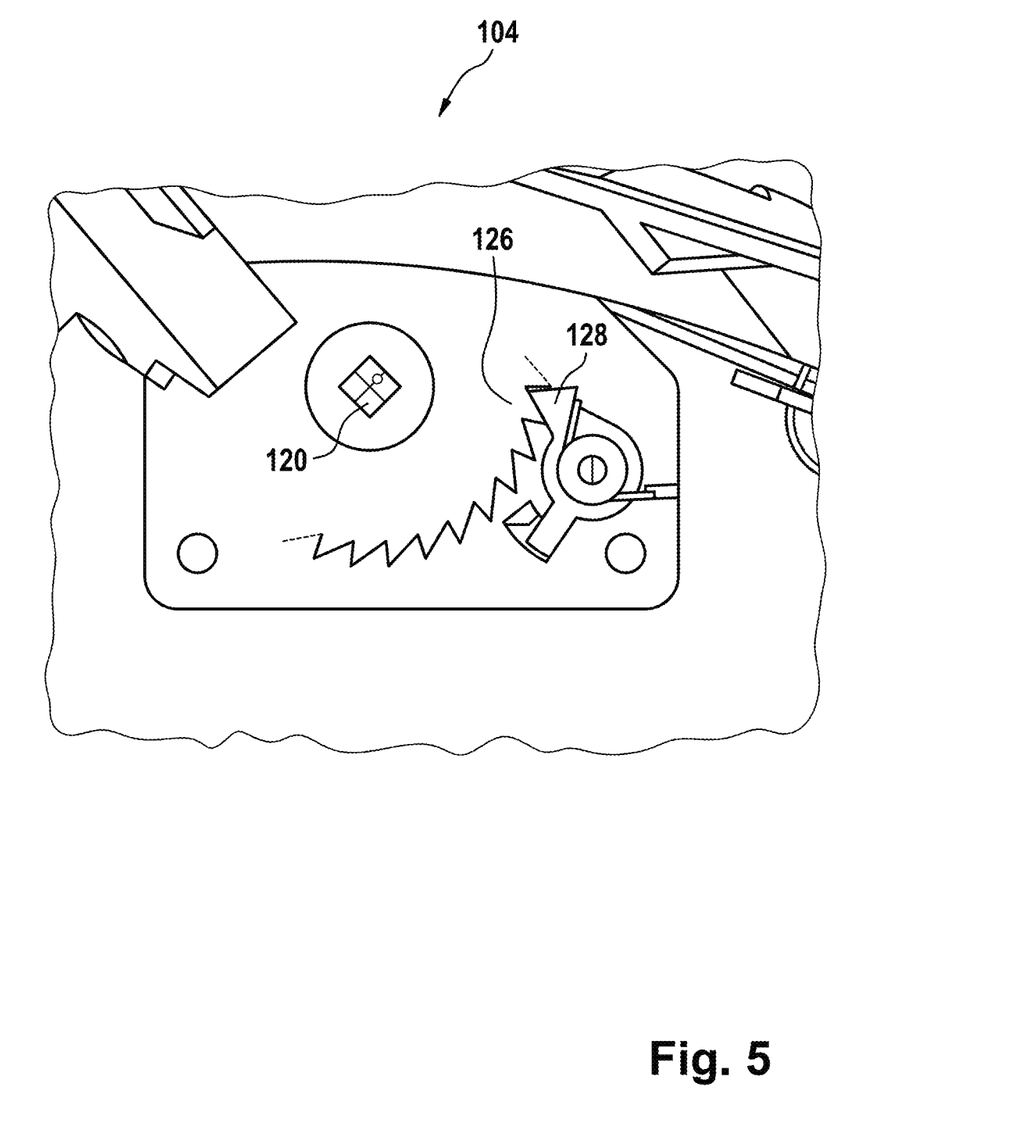
FIG. 5 shows an exemplary ratchet comprised by the motorized harness belt tensioner of FIG. 3.

FIG. 5 shows an exemplary ratchet comprised by the motorized harness belt tensioner 104 of FIG. 3 In accordance with an embodiment. This shows that the drive shaft 120, driven by the electromechanical actuator 122 (not shown), may further force a toothing 126 of a ratchet to rotate along pawl 128, which may be implemented as a spring-loaded pawl. The teeth of the toothing 126 may be arranged, for example, an equal distance from each other. The distance of the teeth may, however, vary to make fine adjustments. The ratchet comprising the toothing 126 and the pawl 128 may additionally ensure that the harness belt is prevented from losing tension due to forces trying to pull the adjuster strap into the child safety seat. To reduce the belt tension acting on the harness belt, the motorized harness belt tensioner 104 comprises a drive for releasing the ratchet, i.e., for disengaging the pawl 128 from the teeth of the toothing 126.

Figure 6:
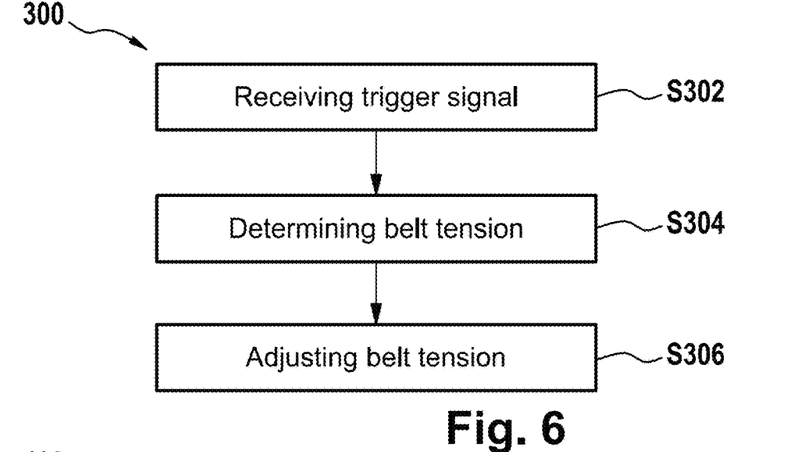
FIG. 6 shows a flow diagram illustrating steps of a first exemplary method of operating a child safety seat.

FIG. 6 shows a flow diagram illustrating steps of an exemplary method 300 of operating the child safety seat 100. In step S302, a trigger signal is received by the controller controlling the motorized harness belt tensioner. The trigger signal indicates that a first predefined belt tension is to be established. The trigger signal may be sent, for example, by a trigger switch upon activation by a user, from a fastening sensor detecting a fastening of the harness belt, or from a belt tension monitor determining a pre-tensioning of the harness belt. In step S304, the belt tension acting on the harness belt is determined using the belt tension monitor. The belt tension monitor may be provided in the form of a separate sensor element or may be comprised by the electromechanical actuator of the motorized harness belt tensioner. If a deviation of the determined belt tension from the first predefined belt tension is detected, in step S306, the belt tension is adjusted to match the first predefined belt tension. Thus, the belt tension may be adjusted to a driving level, i.e. a level of belt tension intended for a usual driving situation of a vehicle in which the child safety seat is installed.

Figure 7:
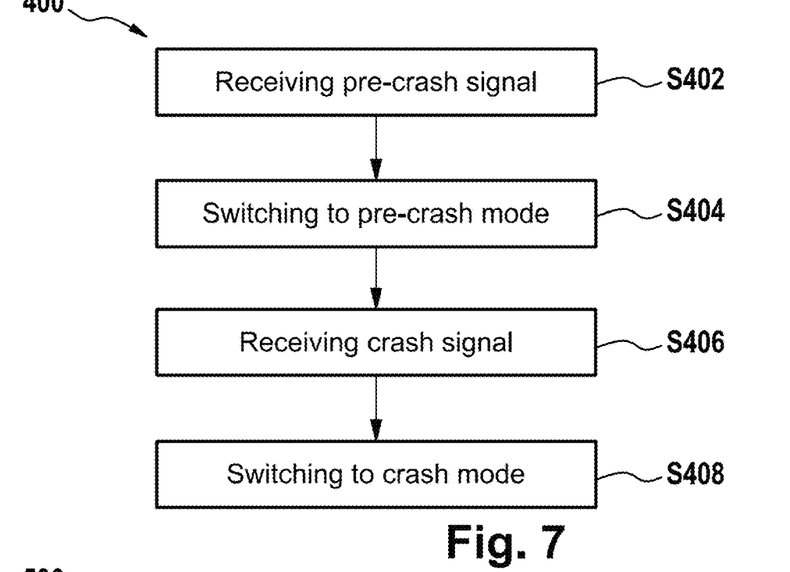
FIG. 7 shows a flow diagram illustrating steps of a second exemplary method of operating a child safety seat.

FIG. 7 shows a further flow diagram illustrating steps of an exemplary method 400 of operating the child safety seat 100. The child safety seat is operated in a driving mode, i.e., the belt tension is adjusted to the first predefined belt tension. In step S402, a first trigger signal or pre-crash signal is received, indicating a potential imminent accident involving the vehicle in which the child safety seat is installed. Such a potential imminent accident may be characterized by increased acceleration and/or deceleration forces acting on the child safety seat and thus on the child restrained therein. Upon receipt of the pre-crash signal, the driving mode may be switched to the pre-crash mode in step S404. Switching to the pre-crash mode may comprise increasing the belt tension from the first predefined belt tension to the second predefined belt tension. In step S406, a crash signal may be received by the controller. Upon receipt of the crash signal, the mode of operation may be switched from the pre-crash mode to the crash mode in step S408. Switching to the crash mode may comprise increasing the belt tension from the second predefined belt tension to a third predefined belt tension. The third predefined belt tension may be applied in the case of high acceleration and/or deceleration forces acting upon the child restrained in the child safety seat to ensure a tighter fixation rigid retainment of the child, i.e., a rigid retainment. In accordance with an embodiment, no pre-crash signal may be received; rather, a crash signal may be directly received, for example, in the case of an accident without warning. In this case, the belt tension may be increased from the first predefined belt tension directly to the third predefined belt tension, i.e., the mode of operation may be directly switched from driving mode to accident mode. In the case that no crash signal is received after having received a pre-crash signal, the pre-crash mode may be switched back to the driving mode, i.e., the belt tension may be reduced from the second predefined belt tension to the first predefined belt tension. This switching may be performed, for example, if no crash signal is detected within a predefined time interval and/or no increased acceleration and/or deceleration forces indicative of a potential imminent accident are detected.

Figure 8:
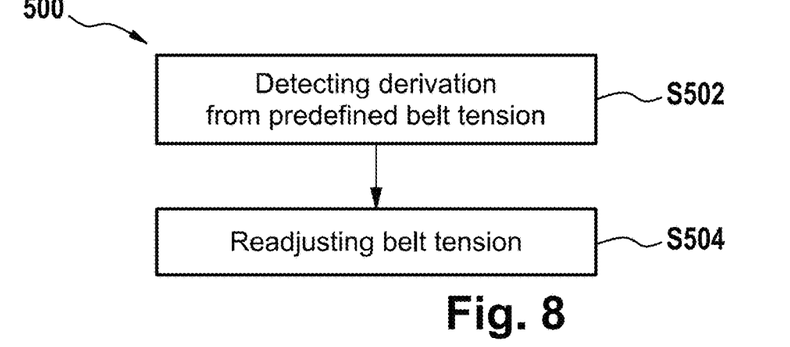
FIG. 8 shows a flow diagram illustrating steps of a third exemplary method of operating a child safety seat.

FIG. 8 shows a further flow diagram illustrating steps of an exemplary method 500 of operating the child safety seat 100. The controller may be adapted for continuously monitoring the belt tension using the belt tension monitor in the driving mode. In other words, the belt tension may have been adjusted to the first predefined belt tension and the belt tension monitor may be used to detect deviations of the belt tension from the first predefined belt tension. In step S502, a deviation from the first predefined belt tension is detected. In step S504, the belt tension is readjusted to re-match the first predefined belt tension. The readjustment may comprise an increase and/or decrease of the belt tension. The belt tension resulting from the readjustment may be monitored by the belt tension monitor to ensure that the readjustment has been performed correctly. Thus, changes of the belt tension due to movements of the child, for example, may be restricted. For example, a readjustment may be executed if the detected deviation of the belt tension exceeds a predefined threshold. Thus, the readjustment may be restricted to cases of strong changes of the belt tension during the drive mode. In the case that the controller switches from drive mode to pre-crash mode and/or crash mode, no readjustment may be performed.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A child safety seat comprising:
an integral harness belt for restraining a child in the child safety seat,
a motorized harness belt tensioner comprising a tensioning element driven by an electro-mechanical actuator and adapted for adjusting the belt tension acting on the harness belt,
a controller adapted for controlling the motorized harness belt tensioner to adjust the belt tension to match a first predefined belt tension, the controller being adapted for controlling the motorized harness belt tensioner to increase the belt tension from the first predefined belt tension to a second predefined belt tension upon receiving a first trigger signal indicating a potential imminent accident of a vehicle in which the child safety seat is installed.

2. The child safety seat of claim 1, wherein the harness belt comprises at least one adjuster strap and wherein the at least one adjuster strap is guided through the tensioning element, and wherein the adjusting of the belt tension is performed by adjusting a tension in the at least one adjuster strap of the harness belt.

3. The child safety seat of claim 1, wherein at least an end section of the harness belt is attached to the tensioning element.

4. The child safety seat of claim 1, wherein the belt tension is increased to match the first predefined belt tension resulting from a manual pre-tensioning of the harness belt.

5. The child safety seat of claim 1, the controller being operationally connectable with a user interface and adapted for signaling information about the belt tension acting on the harness belt to the user interface.

6. The child safety seat of claim 1, further comprising a belt tension monitor adapted for monitoring the belt tension acting on the harness belt, and the controller being further adapted for monitoring the belt tension resulting from the adjustment of the belt tension using the belt tension monitor.

7. The child safety seat of claim 6, the controller being adapted for continuously monitoring the belt tension using the belt tension monitor, the adjusting comprising a re-adjusting of the belt tension to re-match the first predefined belt tension upon detecting a deviation of the belt tension from the first predefined belt tension exceeding a predefined belt tension threshold.

8. The child safety seat of claim 1, wherein an increasing of the belt tension is achieved by shortening a length of the harness belt available for buckling in the child to match the first predefined belt tension.

9. The child safety seat of claim 8, wherein the controller controlling the motorized harness belt tensioner increases the belt tension to match the first predefined belt tension upon receiving a second trigger signal.

10. The child safety seat of claim 9, wherein the second trigger signal is received from a trigger element adapted for triggering the increasing of the belt tension upon a user interaction with the trigger element.

11. The child safety seat of claim 9, wherein the second trigger signal is received from a harness belt fastening sensor upon detection of a fastening of the harness belt.

12. The child safety seat of claim 11, wherein the first trigger signal is sent time-delayed by a predefined interval of time.

13. The child safety seat of claim 12, wherein the first trigger signal is received upon detecting a manual pre-tensioning of the harness belt exceeding a predefined pre-tensioning threshold.

14. The child safety seat of claim 13, the controller being adapted for controlling the motorized harness belt tensioner to decrease the belt tension from the second predefined belt tension to the first predefined belt tension after receiving a pre-crash signal and exceeding a predefined interval of time without receiving a crash signal.

15. The child safety seat of claim 13, the controller being adapted for controlling the motorized harness belt tensioner to increase the belt tension from the second predefined belt tension to a third predefined belt tension upon receiving a third trigger signal in indicating an accident of a vehicle in which the child safety seat is installed.

* * * * *